United States Patent
Huziwara et al.

(10) Patent No.: US 7,081,229 B2
(45) Date of Patent: Jul. 25, 2006

(54) SECOND STAGE CYCLONE DIPLEG TERMINATION DEVICE IN FCC UNITS

(75) Inventors: Wilson Kenzo Huziwara, Rio de Janeiro (BR); Eduardo C. de Melo Guerra, Petrópolis (BR); Waldir Pedro Martignoni, São Mateus do Sul (BR); Aurélio Medina Dubois, Rio de Janeiro (BR); Luiz Carlos Casavechia, São Mateus do Sul (BR); José Mozart Fusco, Niterói (BR)

(73) Assignee: Petroleo Brasileiro S.A., Petrobras (BR)

( * ) Notice: Subject to any disclaimer, the term of this patent is extended or adjusted under 35 U.S.C. 154(b) by 437 days.

(21) Appl. No.: 10/413,223

(22) Filed: Apr. 15, 2003

(65) Prior Publication Data

US 2004/0208801 A1   Oct. 21, 2004

(51) Int. Cl.
    *B32B 5/02*   (2006.01)
(52) U.S. Cl. .................................... 422/144; 422/147
(58) Field of Classification Search ............... 422/144, 422/147
    See application file for complete search history.

(56) References Cited

U.S. PATENT DOCUMENTS

| 4,579,716 | A | * | 4/1986 | Krambeck et al. | ......... 422/113 |
| 4,588,558 | A | * | 5/1986 | Kam et al. | .............. 422/113 |
| 4,624,772 | A | * | 11/1986 | Krambeck et al. | ............ 208/95 |
| 4,749,471 | A | * | 6/1988 | Kam et al. | .................. 208/113 |
| 5,681,450 | A | * | 10/1997 | Chitnis et al. | .............. 208/113 |
| 6,197,226 | B1 | * | 3/2001 | Amagai et al. | .............. 264/1.1 |
| 6,197,266 | B1 | | 3/2001 | Mozart Fusco et al. | |

FOREIGN PATENT DOCUMENTS

BR   PI9603898   6/1998
GB   2 212 248   7/1989

* cited by examiner

Primary Examiner—N. Bhat
(74) Attorney, Agent, or Firm—Nixon & Vanderhye PC (57) ABSTRACT

A second stage cyclone dipleg termination device for cyclones that operate under conditions in which the pressure in the top of the cyclone dipleg is lower than the external pressure where fine particulate matter is collected and discharged. The second stage cyclone dipleg termination device operates in a separator vessel (2) or a vessel of the regenerator of a fluid catalytic cracking (FCC) converter to reverse the pressure conditions commonly found in this type of equipment. One end of a cyclone dipleg (7) is joined to a collector vessel (11), in such a way that a portion of the dipleg (7) enters into the inside of the collector vessel (11). The end of the dipleg (7) is connected to the conventional, normally used sealing device (17) in second stage cyclone (4) diplegs (7). The collector vessel (11), in turn, has on its bottom an outlet in the form of the dipleg (14). On the inside of this outlet an injector device is introduced (16) through which a fluid under high pressure is discharged, associated with a "venturi" type nozzle (15), which moves or drags the particulate matter discharged by the dipleg (7) of the cyclone (4) through the sealing valves (17), inside the collector vessel (11) the exterior of the collector vessel (11).

17 Claims, 5 Drawing Sheets

SECOND STAGE CYCLONE DIPLEG TERMINATION DEVICE IN FCC UNITS

The field of application for the present invention is that of equipment used for separating solids in a gas-solid suspension.

More specifically, it relates to serial cyclones used in fluid catalytic cracking (FCC) processes.

More in particular, the second stage cyclone dipleg termination device.

STATE OF THE ART

The objective of the process of fluid catalytic cracking (FCC) is to convert high boiling point hydrocarbons into lighter hydrocarbon fractions, such as gasoline or liquefied petroleum gas (LPG). The catalyst employed in fluid catalytic cracking units is made up of controlled size particle grains, thoroughly mixed into the load fed to a FCC unit and, afterwards, also to the gaseous products produced by the cracking process, which forms a gas-solid suspension. This requires that it be efficiently separated out to minimize catalyst losses from the FCC unit. This is obviously beneficial for the refiners, the environment, and on the quality of the final products due to the reduction in the percentage of ashes. This also reduces periodic maintenance on the equipment installed downstream from the systems used for separating solids from a gas-solid suspension.

In the field of separation of solid particles from gaseous suspension, the common practice is to use cyclones as the separation device. These cyclones normally use devices on the tips of the cyclone diplegs used for the discharge of solid material. The purpose of these devices is to ensure that the dipleg is sealed against the possibility of gas entering into its interior, which would cause a loss in the systems' collecting efficiency.

In the specific case of the fluid catalytic cracking (FCC) processes, a group of two cyclone separators are typically employed in series to maximize the separation of the particles—the process catalyst—of the gas-solid suspension. The use of more than one group of cyclonic separators is also quite common, according to the size and model of the separating FCC unit's vessel. Most of the particles are separated in the first stage of separation (primary cyclone), and only a much lower concentration of less medium sized catalyst particles needs to be separated in the second stage of separation (secondary cyclone). In this well-known method of operation, the internal pressure of the cyclones is normally always lower than those in the separating vessel, mainly in the case of the secondary cyclone.

In FCC units that adopt closed cyclone fast separating systems (cyclones directly coupled to the tip of the riser), only the cyclone downstream from the closed cyclone fast separating system has a lower internal pressure than that of the separating vessel. The existence of a pressure gradient acting towards the interior of the cyclone dipleg allows a gas stream going from the separating vessel into it, which causes losses in the collection efficiency of the cyclone. Therefore it is necessary to seal the lower end of the cyclones' diplegs through the use of specific devices.

In cyclones operating with a low catalyst concentration, for example, on the order of 1–1000 $g/Nm^3$, usual values found in second stage cyclones, the terminations normally used are flapper or trickle valves, whose main function is described below. The catalyst collected in the secondary cyclone flows freely into the diplegs of the cyclone, forming a dense column of solids that, after reaching a certain level, establishes a balance in the pressure of the bottom of the cyclone dipleg and the inside of the separating vessel. Having reached a pressure balance, the secondary cyclone dipleg's discharge process begins by opening the valve. It is precisely during this collected solids discharge process within the secondary cyclone dipleg that the greatest loss of solids occurs. In reality, losses of solids occur during the entire operation, since the valves used do not provide a perfect seal and, actually, since a perfect seal would increase the risk of clogging the dipleg. Besides, a perfectly closed system, if achieved, could not be replicated because of the operational conditions of the system. Initially the solid column in the dipleg reduces the leakage or the entrance of gas within the dipleg. However, right before the end of the discharge step, the column of solids is quite reduced and the difference in pressure allows a greater stream of gas towards and through the dipleg. This flow drags the solid towards the separation region of the cyclone, with a consequential loss of material through the outlet of the cyclone. Therefore, the secondary cyclone with its valved dipleg termination experiences a constant loss of solid material due to the constant stream of gas through the dipleg. Once the effect of the discharge movement of the solid on the sealing device has ended, it returns to its normally balanced position, beginning another particulate matter collection and accumulation cycle.

From the above, it can be concluded that a critical point of the separation process through cyclonic separators (that also has a direct influence on the efficiency of the FCC process), is the effectiveness of the sealing devices on the cyclones' diplegs. Sealing devices include several types, such as flapper valves, trickle valves or others, such as splash plates or even combinations of more than one of these.

The loss of sealing and the phenomenon of reversed flow occurring from the inside part of the separation vessel toward the second stage cyclone through its dipleg may cause cyclone's dipleg to wear, which may eventually evolve to punctures with an increase in the area where the catalyst is dragged, reducing greatly the efficiency in the entire system.

The search for longer run time for cracking units and for the reduction of particulate matter emissions in the environment are affected, as above cited, by the trustworthiness of sealing valves, which depends on the project, the quality of fabrication, the installation, and even on the operational conditions they are submitted.

In an effort to solve the problem of the sealing valves, English patent GB 2.212.248 explains a method to build a flapper valve that allows sealing almost completely by the application of a conical section installed between the valve base and the tip of the cyclone dipleg.

However, it is important to keep in mind that a small passage of gas fed into the nozzle of the cyclone is beneficial since it provides fluidization of the accumulated solids within the cyclone dipleg, improving its discharge. In this way, an effort to minimize the passage of gas stream through the valve, as proposed by the aforementioned patent, may also cause a loss in fluidity of the accumulated solids within the cyclone dipleg, especially in the second stage of separation.

The Brazilian patent documentation PI 9600002, of the Applicant and which is incorporated herein by reference, explains a method of reducing the stream of gas from inside the vessel to the dipleg in the second stage cyclone, by using serial trickle or flapping valves sealing devices. This type of sealing valves may be efficient to avoid or reduce losses of particulate matter during the discharge process. However, it has not been shown to be as efficient, in regards to treating continual leakage that occurs in the period of time between the above mentioned collected particulate matter discharge events.

Another point regarding the sealing valves focuses on the possibility of coke formation on the inside of the vessel used for installing the first sealing valve, of a set of two sealing devices used in series.

As alternative to modifying sealing devices, Brazilian application PI 9603898, of the Applicant and which is incorporated herein by reference, shows that it is possible to avoid the stream of gas from the inside of the separating vessel to the inside of the secondary cyclone dipleg, with the consequential return of particulate matter to the inside of the separation region of the cyclones installed in fluid catalytic cracking units, by the formation of a joint dipleg composed of the junction of the primary and the secondary cyclone diplegs, removing the traditional sealing devices, such as the flapper and trickle valves, which are the principal sources of problems and leakage in the cyclonic separating systems. However, this arrangement, while very satisfactory in many cases, may not bring the desired benefits for some fluid catalytic cracking units, mainly in the case in those where the physical arrangement of the primary cyclones and the traditional sealing devices (such as flapper and trickle valves) do not allow joining the cyclones' diplegs as mentioned in the above mentioned patent.

Document U.S. Pat. No. 5,681,450 purposes a cyclone with induced bleeding to remove the collected catalyst through a gas stream. The gas must be returned to the cyclone in a controlled manner to avoid a fluctuating or pulsating condition during the catalyst removal that would induce the gas entering into the dipleg. The way that was found to avoid such phenomenon was to re-feed the induced bleeding gas stream towards the lateral side of the cyclone's body, in the longitudinal axis of it, because it is a region with low pressure that will suction the gas into the interior of the cyclone. This arrangement is mainly used in third stage cyclones, where the cyclone dipleg discharges' point is not in contact with the cyclone entrance or feed and the catalyst dust being very fine, cannot drain off. The return of the gas in the region of the cyclone's longitudinal axis does not seem to be very beneficial, since, once the solids carried by this gas do not fulfill the minimum condition to be separated out once again, they exit together with the gas in the main gas outlet, thus causing material loss.

SUMMARY OF THE INVENTION

The concept of the present invention is mainly applicable to cyclones in series that operate under conditions in which the pressure in the top of the cyclone dipleg is lower than the external pressure where fine particulate matter is collected and discharged.

The present invention deals with the second stage cyclone dipleg termination device which operates in a separating vessel or in a regenerator vessel of a fluid phase catalytic cracking (FCC) converter and has the capability to reverse the pressure conditions in the equipment in order to prevent the reverse stream of gases from the inside of the regenerator vessel or separator to the inside of the cyclone dipleg.

The end of the cyclone's dipleg is connected to a collector vessel, so that a portion of the dipleg enters the inside of the collector vessel. A sealing device is connected to the end of the cyclone's dipleg. This device may be conventional, as the ones normally used in the diplegs of second stage cyclones, possibly being, for example, a type of valve, such as the trickle or flapping valve, or any other device that works to control the discharge of particulate matter collected in the cyclone dipleg. In order to drag the particulate matter discharged by the cyclone dipleg through the sealing valves, an injection of a fluid is made in a region near the sealing valves.

Hereinafter, fluid must be understood as a stream of steam, air, or other gas, inert or not.

When dealing with the inside of a separating vessel of a fluid phase catalytic cracking (FCC) converter, the injected fluid is steam, that also serves the function of avoiding the formation of coke in this area.

The collector vessel connected to the end of the secondary cyclone's dipleg, in turn, has on its bottom an outlet in the shape of a dipleg. On the inside of this outlet is introduced a device through which is discharged a fluid under high pressure, together with a "venturi" type nozzle, which promotes the drags the injected fluid in the area of the sealing valves and of the particulate matter discharged by the cyclone dipleg through the sealing valves, from inside of the collector vessel to its exterior, through the outlet which takes the shape of the collector vessel dipleg. In this way, the collector vessel outlet is used as an ejector, that has as its principal characteristic the fact that it does not add any restriction to the flow of collected particulate, as long as the aforementioned ejector has approximately the same dimensions of the collector vessel dipleg, making possible a stream of gas from the inside of the collector vessel directed towards the region where the fine particles collected will be discharged.

The second stage cyclone dipleg termination, in the manner mentioned above, provides two types of sealing:

The first, through the conventional valve-type sealing device, that always allows a small amount of gas leakage due to existing and necessary openings in their lids that cause a loss of collecting efficiency of the cyclone when the pressure in the device where particulate matter is discharged is greater than the pressure within the cyclone dipleg.

The second, a sealing made by the ejector installed on the collector vessel outlet, that does not allow gas leakage from the inside of the separating vessel or of the regenerator towards the collector vessel dipleg and from the inside of the collector vessel towards the cyclone dipleg, thus eliminating the loss of cyclone's collecting efficiency caused by gas leakage within the cyclone dipleg.

BRIEF DESCRIPTION OF THE ILLUSTRATIONS

The characteristics of the second stage cyclone dipleg termination device in FCC units, the object of the present invention, will be better understood through the detailed description given below, just as an example, together with the drawings referenced below, which are an integral part of the present report.

DETAILED DESCRIPTION OF THE INVENTION

The detailed description of the second stage cyclone dipleg termination device in FCC units, the object of the present invention, shall be made in accordance with the identification of the components it is made of, based on the above described figures.

Figure 1:
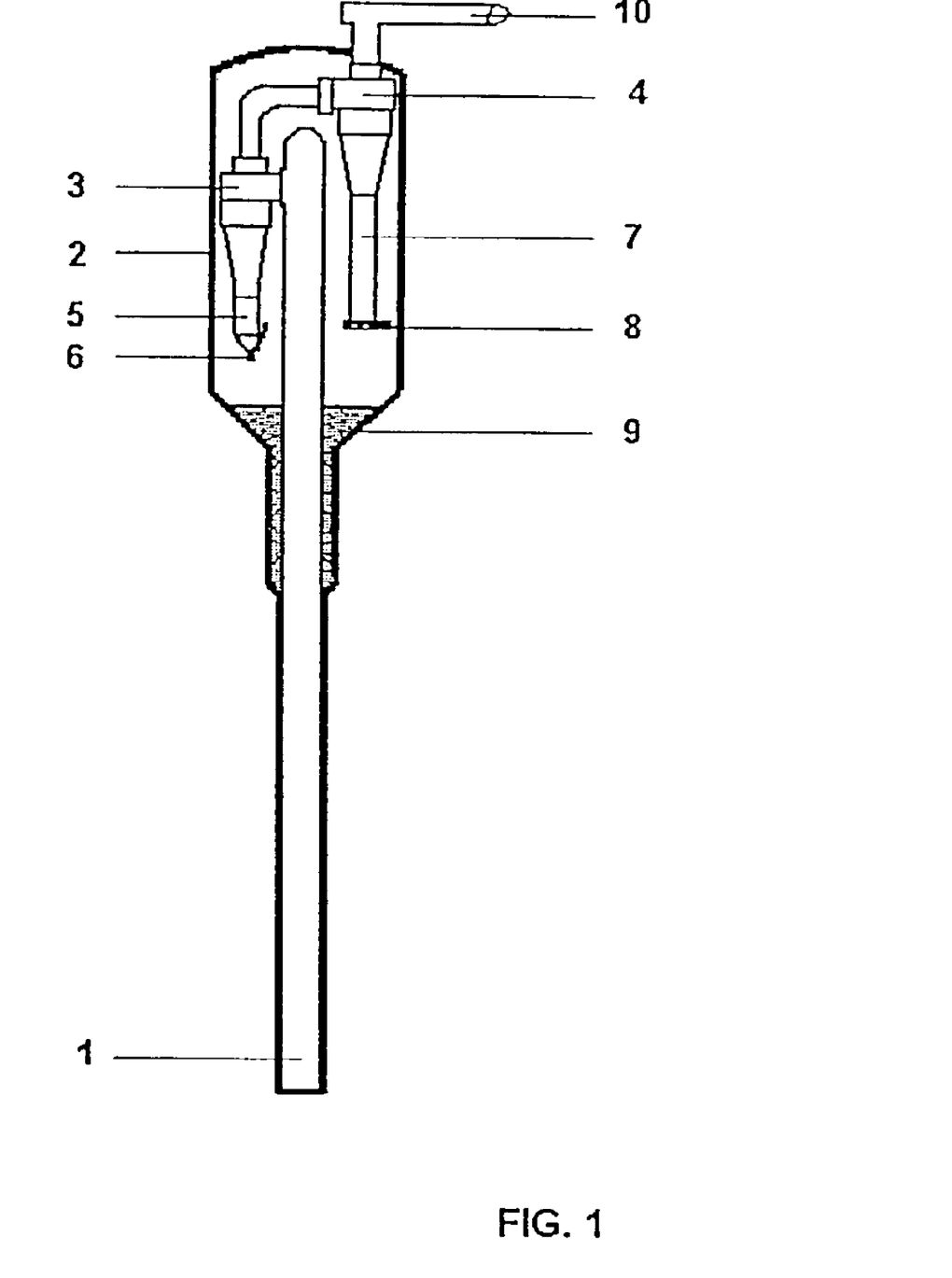
FIG. 1 shows a schematic drawing of a typical FCC unit reaction/separation assembly, present in the state of the art.

FIG. 1 shows a standard reaction/separating unit for fluid catalytic cracking process and is explained below so that a better understanding may be attained of what exists in the state of art. The process includes cracking reactions of a feed load of hydrocarbons in gaseous phase in suspension with catalyst particles throughout the entire extension of a reactor tube of ascending flow that shall hereinafter be called "riser" (1). As a result of these reactions, the formation of a carbonized deposit occurs on the surface of the catalyst.

On the end of the riser (1) there is a fast separation between the coked catalyst particles and the cracked hydrocarbons in which they were in suspension. In this way, the effluent reacting stream enters the first cyclonic separator (3), where the separation of largest amount of the catalyst in suspension occurs, which, due to the action of gravitational force, flows freely through the dipleg (5) of the cyclone (3) being retained by a sealing valve, in such case, by the sealing valve (6) shown, as example, such as a trickle valve.

The cracked hydrocarbons separated in the first cyclone (3), still entraining catalyst particles, enter the second cyclone (4), where they are again submitted to a separation process, the gaseous phase following for external cracked products distillation systems (10) and the catalyst particles falling freely, an example of what has previously occurred in the cyclone (3), towards the dipleg (7) of the cyclone (4), being retained in another sealing valve, in this case by the other sealing valve (8) shown, as example, as a flapping valve.

Due to the column of catalyst particles that accumulate on the top of the sealing valves (6, 8), a balance of pressure is obtained, in a certain moment of the process, between the inside lower part of the diplegs (5, 7) of the cyclones (3, 4) and the inside of the separator vessel (2), and this is usually a higher pressure than that found on the inside of the cyclones. Thus the top of the valve is opened, by the force of the balance of pressure, a column of accumulated solids within the diplegs of the cyclones (5, 7) flows to the fluidized bed (9) that accumulates in the bottom of the separator vessel (2). At this time, the equalized pressure condition ends, causing the valve top to return to its closed position.

This is the most critical moment of the separation stage, a time when it is practically impossible to avoid some entrainment of catalyst particles back to the inside of the cyclone (4), by the force of an almost inevitable reverse flow of the gas stream towards the inside of the cyclone dipleg (7), due to the time needed to complete the closing of the sealing valve (8). In this way, conventional cyclonic separating systems almost always operate outside ideal conditions of efficiency and profitability.

The present invention deals with a termination for second stage cyclone (4) diplegs (7), that is capable of causing a reversal in existing pressure profiles in this type of equipment, and of preventing the reverse flow phenomenon of the gas stream originating from inside the separator vessel (2) or regenerator, towards the inside of the cyclone (4) dipleg (7).

Figure 2:
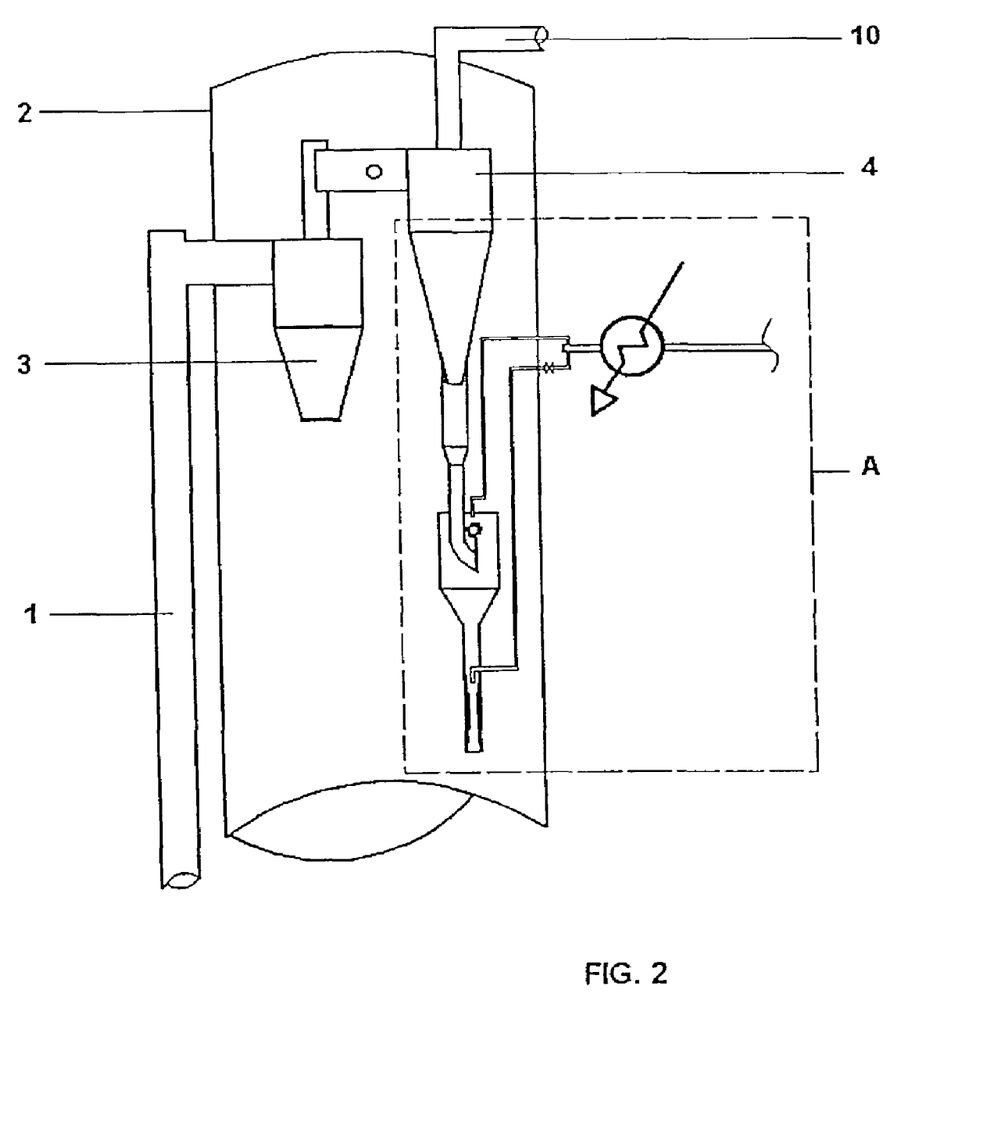
FIG. 2 shows a schematic drawing of a separating system with cyclones in series, with a second stage cyclone termination dipleg shown in the dashed area (A), in accordance with the present invention.

FIG. 2 presents a drawing of a particle separating system present in FCC units, where a termination (A) on the dipleg (7) of the second stage cyclone (4) is used, shown in the dashed area in accordance with the present invention.

Figure 3:
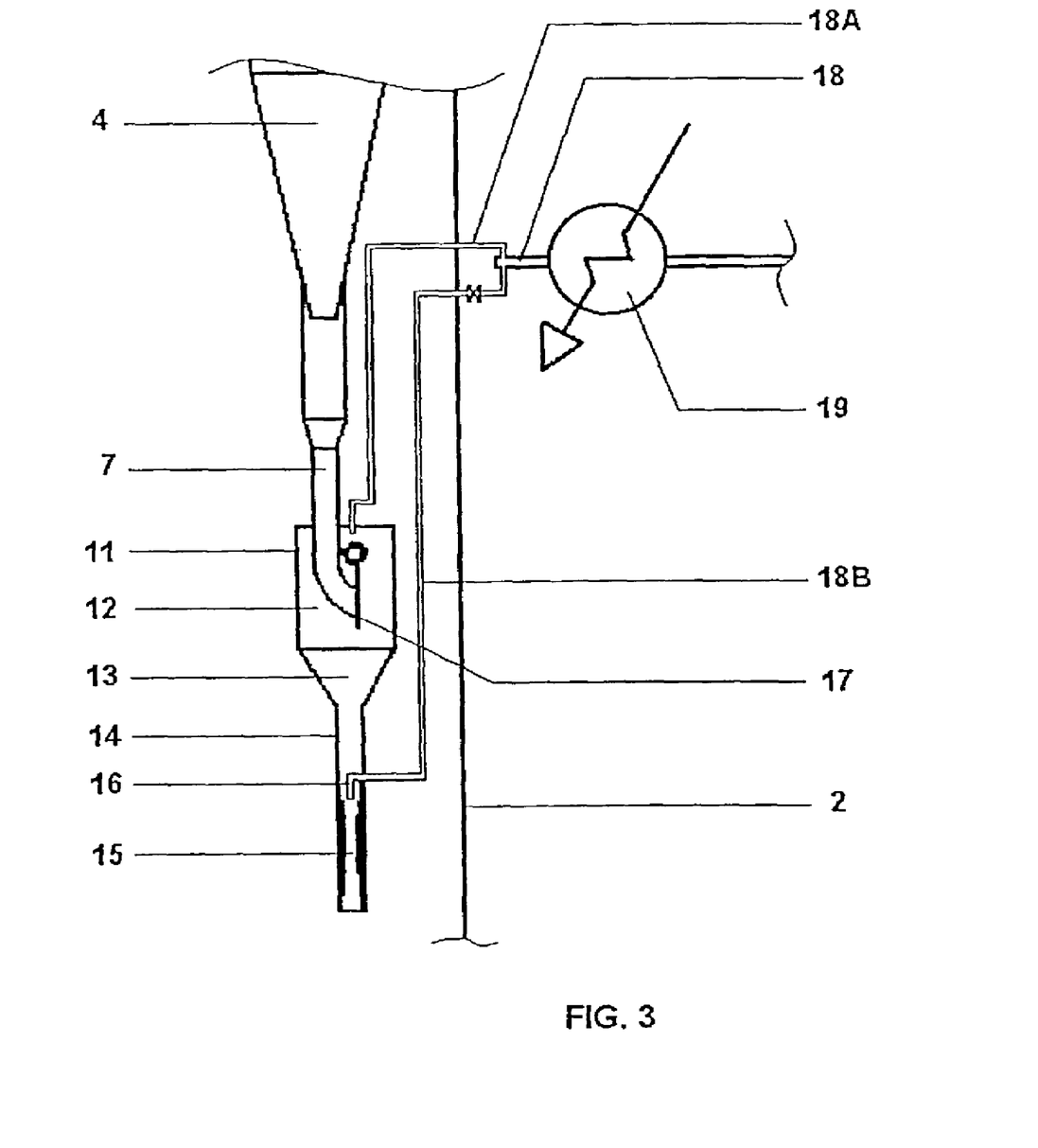
FIG. 3 shows a detailed schematic drawing of a cyclone dipleg termination, in accordance with the present invention, shown in the dashed area (A) in FIG. 2.

In FIG. 3, more details may be seen in the drawing of the first device setup of the termination (A) that was already shown in FIG. 2.

It should be pointed out that it includes:

A sealing device (17), for example, a trickle valve, connected to the end of a second stage cyclone (4) dipleg (7);

A collector vessel (11), inside of which enters the above described assembly. This vessel (11) is presented as substantially cylindrical in its upper part (12), from which, in the lower part, the cone shaped body is considerably elongated (13) and that, in turn, is connected to the collector vessel outlet, that shall hereinafter be called the vessel dipleg (14);

A venturi type nozzle (15) installed inside of the vessel dipleg (14) next to the outlet of the latter;

An injector (16) for the purpose of injecting a fluid, connected to the inside wall of the vessel dipleg (14), immediately above the venturi (15);

Tube (18) for transporting a fluid, which is linked by one of its ends to a heater (19), electrical for example, and low powered. The other end of the tube (18) branches off into two different tubes: the first tube (18A) for fluids, enters the top of the collector vessel (11) and its free end is positioned immediately above the sealing valve (17) of the cyclone (4) dipleg (7) to protect the bearing pins on the sealing valve cover (17), to act as a fluid for dragging the particulate matter discharged from the sealing valve (17) connected to a cyclone dipleg (7) and to avoid the formation of coke on the inside of the collector vessel (11) when applied to the inside of the separator vessel (2) of the fluid catalytic cracking converter; and the second tube (18B) for fluids, which links the outside wall of the vessel dipleg (14) and to the injector (16) by its end and, together with the venturi (15), causes the ejection effect of the gases and particulate from the inside of the collector vessel (11) towards the vessel (2) of the separator or of the regenerator of the fluid catalytic cracking (FCC) converter. The use of the sealing device (17) together with the injection of fluid through the first tube (18A), avoids dragging an excess of processing gas from the inside of cyclone (4), when an exaggerated amount of fluid is injected by the injector (16).

In the event that there is a fall in the amount or even a lack of the injection of the fluid by the injector (16), the sealing valve (17) allows the device to operate with efficiency comparable up to conventional systems for the separation of particulate matter in a gas-solid suspension.

The use of the collector vessel (14) together with the sealing valve (17), acts as a security system for momentary or start up failures of the system, favoring an overall operation, by having a lower processing gas flow from the inside of the second stage cyclone (4) dipleg (7).

Figure 4:
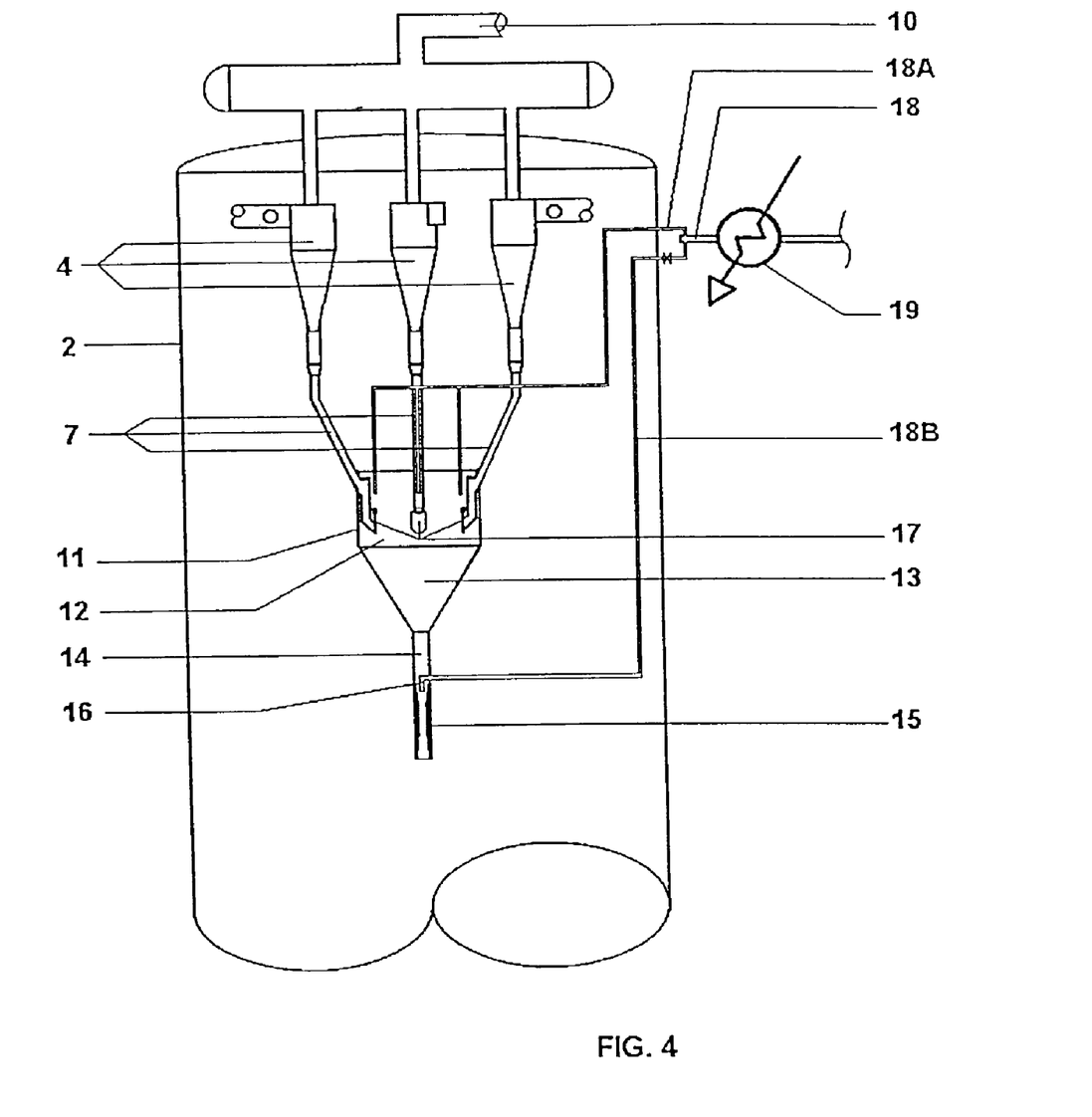
FIG. 4 shows a schematic drawing of a separating system, with a cyclone dipleg termination adapted for several diplegs on a multiple cyclone assembly.

FIG. 4 shows a schematic drawing of another possible device setup for the termination that is the object of the present invention, in this case, in an application with a group of secondary cyclones (4). It should be highlighted that in this drawing the first stage cyclone has not been illustrated (3) even though it is present.

It may be seen in FIG. 4 that a sealing device (17) is connected to the end of each dipleg (7) of each one of the secondary cyclones (4). A final portion of the group made up by the sealing devices (17) connected to each one of the diplegs (7) reaches inside the collector vessel (11). The collector vessel (11) has only one dipleg (14) as an outlet. On the inside of the vessel dipleg (14), one single venturi type nozzle is installed (15) and, then just above that, it is installed a fluid injector (16). One of the branches of the tubes (18) coming from the heater (19), the first fluid tube (18A), enters into the upper part of the collector vessel (11), it is divided by the same number of cyclone (4) diplegs (7), and discharges fluid on each of the sealing devices (17) on each secondary cyclone (4) dipleg (7). The other branch, a second fluid tube (18B), is attached to the outside wall of the vessel dipleg (14) and to the injector (16).

Due to this configuration, driven fluid consumption is optimized in the ejector that includes the venturi (15) and the injector (16).

Figure 5:
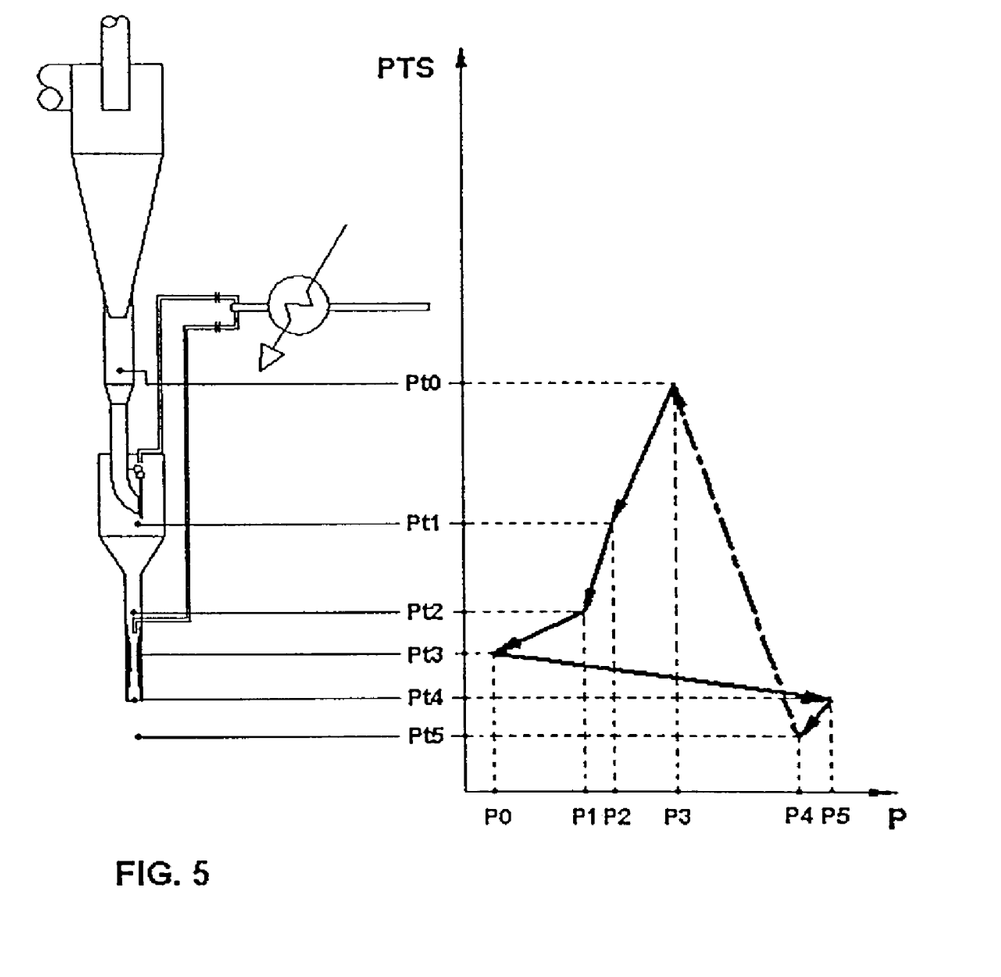
FIG. 5 shows a drawing, in the form of a plot, of the pressure conditions related to positions shown in the drawing of the second stage cyclone dipleg termination in accordance with the present invention.

FIG. 5 presents a drawing of a pressure profile (P) in relation to the positions (PTS) along certain points located in a system with a second stage cyclone equipped with a termination which is the object of the present invention. In this drawing, in an effort to simplify, the first device setup of the invention is being taken as a base. The first stage cyclone has not been illustrated (3), even though it is present.

The continuous arrows of the graph link different pressure points in relation to two different positions and indicates the direction of the gas stream from the first point to the second point, in a situation where the fluid has been injected into the ejector which includes the injector (16) and the venturi type nozzle (15), and in the outlet of the first tube (18A) located over the sealing valve (17). The dashed line arrow indicates the direction of the gas stream in a situation where the fluid has not been injected into the ejector, which includes the injector (16) and the venturi type nozzle (15), and in the outlet of the first tube (18A) located over the sealing valve (17).

The pressure values plotted follow the ratios below:

$$P0<P1<P2<P3<P4<P5.$$

Using, as a base, the functioning of the device with the injection of fluid through the first tube (18A) and through the injector (16), at the first position (Pt0), the top of the cyclone (4) dipleg (7), it can be observed that the gas flows with pressure value (P3). Upon going through the sealing valve (17) the gas passes through the second position (Pt1), on the inside of the collector vessel (11), where pressure value (P2) becomes lower than the value of prior point (Pt0) due to a second injection of fluid through the injector (16). Then the gas reaches point (Pt2), a position that is immediately before the injector (16), where it reaches an even lower pressure value (P1) while it begins to increase its acceleration. At point (Pt3), located halfway of the venturi type nozzle (15), due to the effect the injection of fluid into the injector (16) the gas reaches a maximum acceleration with a minimum pressure value (P0). At this end of the vessel dipleg (14), it is found position (Pt4), after passing through the venturi type nozzle (15), where the gas decelerates and recuperates its pressure, which elevates to a maximum value (P5), higher than pressure (P4), verified at point (Pt5) located on the inside of the vessel (2) of the regenerator or the FCC converter, eliminating the possibility of reverse flow of gas.

In the same FIG. 5 it can be seen that, in the case of not having injected the fluid through the outlet of the first tube (18A) and through the injector (16), the gas flows from point position (Pt5) on the inside of the vessel (2) of the converter or the regenerator that has pressure value (P4), to position (Pt0) in the top of the cyclone (4) dipleg (7), passing through the openings that naturally occur in the sealing valve (17), with final pressure value (P3),with performance and efficiency comparable to a state of art cyclone as it has already been described in FIG. 1.

The inside wall of the vessel dipleg (14) in the injection region of the fluid flow, as well as the outside surface of the injector (16), of the venturi (15) and of the sealing valve (17), are lined with a refractory material that is wear resistant.

Any one of the possible device setups apply to cyclone diplegs, whether they are aligned or not with the cyclone axis, or applied to a group of cyclone diplegs with a single termination.

The description made here of the second stage cyclone dipleg termination device in FCC units, the object of the present invention, should be considered only as possible device setups, and any particular characteristics introduced herein should be understood only as something that was described to facilitate understanding. In this way, they should not in any way be considered as limitations of the invention, which is only limited by the scope of the claims that follow.

The invention claimed is:

1. Termination for second stage cyclone diplegs, that operate in series in separating vessels or regenerators of fluid catalytic cracking (FCC) converters for causing a reversal in pressure profile so that the pressure in the outlet of the cyclone dipleg is higher than the pressure of the separator vessel or regenerator to prevent a reverse flow of a gas stream originating from inside of the separator vessel or regenerator towards the inside of the cyclone dipleg, the termination including:
   a sealing device connected to the distal end of a second stage cyclone dipleg;
   a collector vessel, inside of which the distal end of the second stage cyclone dipleg is disposed, the collector vessel being substantially cylindrical in its upper part, from which, in the lower part, a cone shaped body extends that, in turn, is connected to a collector vessel dipleg;
   a venturi type nozzle installed on the inside of the collector vessel dipleg adjacent to an outlet of the collector vessel dipleg;
   an injector for the purpose of injecting a fluid, which is connected to the inside wall of the collector vessel dipleg, immediately above the venturi;
   tube for transporting a fluid, linked by one of its ends to a heater and with the other end bifurcated into two tubes, the first tube, entering the top of the collector vessel and having its free end positioned above the sealing valve of the cyclone dipleg and the second tube linking to the injector.

2. Termination for second stage cyclone diplegs, in accordance with claim 1, wherein there is an injection of fluid by way of the first tube and through the injector, the gas on the inside of the cyclone flows from the top of the secondary cyclone dipleg subject to a pressure value (P3), passing through the sealing valve towards the interior of the collector vessel, subject to a lower pressure value (P2), lower than (P3), due to an injection of fluid through the injector, following which, before reaching the injector, the gas begins to gain acceleration while the pressure continues to fall, from the lower value (P2) to another value (P1), then at the halfway of the venturi type nozzle, the gas reaches the maximum acceleration with the minimum pressure (P0), and afterwards the gas begins to lose acceleration and to recover pressure until it reaches the maximum value (P5) and leaves toward the vessel of the converter or of the regenerator where the pressure is lower (P4).

3. Termination for second stage cyclone diplegs, in accordance with claim 2, wherein the pressure profile obeys the following size ratio: P0<P1<P2<P3<P4<P5.

4. Termination for second stage cyclone diplegs, in accordance with claim 1, wherein the secondary cyclone dipleg is aligned with the cyclone axis.

5. Termination for second stage cyclone diplegs, in accordance with claim 1, wherein the sealing valve is a trickle valve.

6. Termination for second stage cyclone diplegs, in accordance with claim 1, wherein the first tube feeds the fluid for entraining the particulate matter discharged by the cyclone dipleg through the respective sealing valve, to protect the bearing pins on the sealing valve top, and to prevent the formation of coke on the inside of the collector vessel when applied in a separating vessel of a fluid catalytic cracking (FCC) converter.

7. Termination for second stage cyclone diplegs, in accordance with claim 1, wherein the second tube for fluid, together with the venturi type nozzle, have the effect of expelling the gases and particulate matter present from the inside of the collector vessel to the separating vessel where second stage cyclone is installed.

8. Termination for second stage cyclone diplegs, in accordance with claim 1, wherein inside walls of the vessel dipleg in the gas stream injection area, to the external surface of the injector, to the surface of the venturi and the sealing valve are lined with a refractory material that is wear resistant.

9. Termination for second stage cyclone diplegs, in accordance with claim 1, applied to a group of cyclone diplegs with a single termination.

10. Termination for second stage cyclone diplegs, in accordance with claim 1, including a group of secondary cyclones with a respective sealing device connected to the end of each secondary cyclone dipleg, the distal ends of which are disposed inside a single collector vessel, that presents only one dipleg as an outlet, on the inside of which is installed a single venturi type nozzle with a fluid injector linked to the second fluid tube above it, and wherein the first fluid tube, which enters the upper part of the collector vessel, is divided in correspondence to the number of secondary cyclone diplegs, to discharge fluid on the sealing device of each dipleg of each secondary cyclone.

11. Termination for second stage cyclone diplegs, in accordance with claim 10, wherein at least one of the cyclone diplegs is not aligned with the respective cyclone axis.

12. Termination for second stage cyclone diplegs, in accordance with claim 10, wherein there is an injection of fluid by way of the first tube and through the injector, the gas on the inside of the cyclone flows from the top of the secondary cyclone diplegs subject to a pressure value (P3), passing through the sealing valve towards the interior of the collector vessel, subject to a lower pressure value (P2), lower than (P3), due to an injection of fluid through the injector, following which, before reaching the injector, the gas begins to gain acceleration while the pressure continues to fall, from the lower value (P2) to another value (P1), then at the halfway of the venturi type nozzle, the gas reaches the maximum acceleration with the minimum pressure (P0), and afterwards the gas begins to lose acceleration and to recover pressure until it reaches the maximum value (P5) and leaves toward the vessel of the converter or of the regenerator where the pressure is lower (P4).

13. Termination for second stage cyclone diplegs, in accordance with claim 12, wherein the pressure profile obeys the following size ratio: P0<P1<P2<P3<P4<P5.

14. Termination for second stage cyclone diplegs, in accordance with claim 10, wherein the first tube feeds the fluid for entraining the particulate matter discharged by the cyclone diplegs through the sealing valves, to protect the bearing pins on the sealing valve tops, and to prevent the formation of coke on the inside of the collector vessel when applied in a separating vessel of a fluid catalytic cracking (FCC) converter.

15. Termination for second stage cyclone diplegs, in accordance with claim 10, wherein the second tube for fluid, together with the venturi type nozzle, have the effect of expelling the gases and particulate matter present from the inside of the collector vessel to the separating vessel where second stage cyclone is installed.

16. Termination for second stage cyclone diplegs, in accordance with claim 10, wherein inside walls of the vessel dipleg in the gas stream injection area, to the external surface of the injector, to the surface of the venturi and the sealing valve are lined with a refractory material that is wear resistant.

17. Termination for second stage cyclone diplegs, in accordance with claim 10, wherein the sealing valves are trickle valves.

* * * * *